United States Patent
Boia et al.

(10) Patent No.: US 10,110,622 B2
(45) Date of Patent: Oct. 23, 2018

(54) SECURITY SCANNER

(71) Applicant: Microsoft Technology Licensing, LLC, Redmond, WA (US)

(72) Inventors: Dragos Boia, Seattle, WA (US); Barry Markey, Kirkland, WA (US); Donald Ankney, Seattle, WA (US); Viresh Ramdatmisier, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 312 days.

(21) Appl. No.: 14/621,618

(22) Filed: Feb. 13, 2015

(65) Prior Publication Data
US 2016/0241582 A1   Aug. 18, 2016

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC ..... H04L 63/14; H04L 63/1433; G06F 21/20; G06F 21/57; G06F 21/577
See application file for complete search history.

(56) References Cited

U.S. PATENT DOCUMENTS

| | | | |
|---|---|---|---|
| 6,801,503 B1 | 10/2004 | Wetherall | |
| 7,058,015 B1 | 6/2006 | Wetherall et al. | |
| 7,159,237 B2 | 1/2007 | Schneier et al. | |
| 7,359,930 B2 | 4/2008 | Jackson et al. | |
| 7,424,619 B1 | 9/2008 | Fan et al. | |
| 7,444,404 B2 | 10/2008 | Wetherall et al. | |
| 7,475,141 B1 | 1/2009 | Anderson et al. | |
| 7,529,192 B2 | 5/2009 | Labovitz | |
| 7,596,807 B2 | 9/2009 | Ptacek et al. | |
| 7,603,715 B2 | 10/2009 | Costa et al. | |
| 7,634,812 B2 | 12/2009 | Costa et al. | |
| 7,634,813 B2 | 12/2009 | Costa et al. | |

(Continued)

FOREIGN PATENT DOCUMENTS

| | | |
|---|---|---|
| CA | 2452285 | 1/2003 |
| EP | 1348285 | 1/2003 |

(Continued)

OTHER PUBLICATIONS

Assar, Said, A Behavioral Perspective in Meta-modeling, Jul. 2011.

(Continued)

*Primary Examiner* — Saleh Najjar
*Assistant Examiner* — Devin E Almeida

(57) ABSTRACT

Systems and methods for automated selection of payloads for use in a security scan of a web application by a security scanner are described herein. More specifically, the systems and methods test potential payloads for a security scan of a given web application on a test application with known security vulnerabilities, evaluate valid response returned by this test application, determine functionally equivalent responses, group payloads based the equivalence of their valid responses, and select one or more payloads from each created group for use in the security scan of the given web application.

20 Claims, 9 Drawing Sheets

(56) References Cited

U.S. PATENT DOCUMENTS

| | | | |
|---|---|---|---|
| 7,690,037 B1 | 3/2010 | Hartmann | |
| 7,730,531 B2 | 6/2010 | Walsh | |
| 7,774,459 B2 | 8/2010 | Wang et al. | |
| 7,779,304 B2 | 8/2010 | Jennings | |
| 7,841,007 B2 | 11/2010 | Currie et al. | |
| 7,844,696 B2 | 11/2010 | Labovitz et al. | |
| 7,970,886 B1 | 6/2011 | Wetherall et al. | |
| 8,001,271 B1 | 8/2011 | Malan et al. | |
| 8,087,088 B1 | 12/2011 | Pennington et al. | |
| 8,103,755 B2 | 1/2012 | Malan et al. | |
| 8,112,546 B2 | 2/2012 | Razmov et al. | |
| 8,136,029 B2 | 3/2012 | Jagdale et al. | |
| 8,146,160 B2 | 3/2012 | Orr et al. | |
| 8,266,698 B1 | 9/2012 | Seshardi et al. | |
| 8,271,678 B2 | 9/2012 | Wetherall et al. | |
| 8,291,499 B2 | 10/2012 | Aziz et al. | |
| 8,312,536 B2 | 11/2012 | Nachenberg et al. | |
| 8,365,290 B2 | 1/2013 | Young | |
| 8,370,929 B1 | 2/2013 | Pennington et al. | |
| 8,370,939 B2 | 2/2013 | Zaitzev et al. | |
| 8,424,072 B2 | 4/2013 | Pullikottil et al. | |
| 8,463,901 B2 | 6/2013 | Caram | |
| 8,474,044 B2 | 6/2013 | Zawadowskiy et al. | |
| 8,509,086 B2 | 8/2013 | Anderson et al. | |
| 8,549,139 B2 | 10/2013 | Labovitz et al. | |
| 8,555,391 B1 | 10/2013 | Demir et al. | |
| 8,566,935 B2 | 10/2013 | Lagar-Cavilla et al. | |
| 8,572,735 B2 | 10/2013 | Ghosh et al. | |
| 8,578,494 B1 | 11/2013 | Engler et al. | |
| 8,595,176 B2 | 11/2013 | Wang et al. | |
| 8,595,837 B2 | 11/2013 | Antony et al. | |
| 8,656,495 B2 | 2/2014 | Sima et al. | |
| 8,661,522 B2 | 2/2014 | Huston, III et al. | |
| 8,667,047 B2 | 3/2014 | Jackson et al. | |
| 8,745,592 B1 | 6/2014 | Ormandy et al. | |
| 8,769,683 B1* | 7/2014 | Oliver | G06F 21/561 |
| | | | 719/311 |
| 8,832,265 B2 | 9/2014 | Kozine et al. | |
| 8,863,280 B1 | 10/2014 | Pennington et al. | |
| 9,083,729 B1 | 7/2015 | Doshi et al. | |
| 2002/0107960 A1 | 8/2002 | Wetherall et al. | |
| 2002/0143980 A1 | 10/2002 | Wetherell et al. | |
| 2003/0002436 A1 | 1/2003 | Anderson et al. | |
| 2003/0037136 A1 | 2/2003 | Lekel-Johnson et al. | |
| 2003/0131100 A1 | 7/2003 | Godon et al. | |
| 2003/0159063 A1* | 8/2003 | Apfelbaum | G06F 21/577 |
| | | | 726/25 |
| 2004/0004941 A1 | 1/2004 | Langhorst et al. | |
| 2004/0103211 A1 | 5/2004 | Dysart et al. | |
| 2004/0111708 A1 | 6/2004 | Calder et al. | |
| 2004/0193918 A1 | 9/2004 | Green et al. | |
| 2005/0005017 A1 | 1/2005 | Ptacek et al. | |
| 2005/0018602 A1 | 1/2005 | Labovitz | |
| 2005/0018608 A1 | 1/2005 | Wetherell | |
| 2005/0216956 A1 | 9/2005 | Orr et al. | |
| 2007/0094491 A1 | 4/2007 | Teo et al. | |
| 2008/0059544 A1 | 3/2008 | Rahim | |
| 2008/0120420 A1 | 5/2008 | Sima et al. | |
| 2008/0184208 A1 | 7/2008 | Sreedhar et al. | |
| 2008/0184371 A1 | 7/2008 | Moskovitch et al. | |
| 2008/0201779 A1* | 8/2008 | Tahan | G06F 21/564 |
| | | | 726/23 |
| 2009/0168648 A1 | 7/2009 | Labovitz et al. | |
| 2009/0313699 A1 | 12/2009 | Jang et al. | |
| 2010/0077481 A1* | 3/2010 | Polyakov | G06F 21/552 |
| | | | 726/24 |
| 2010/0082513 A1* | 4/2010 | Liu | H04L 63/1458 |
| | | | 706/46 |
| 2010/0177943 A1 | 7/2010 | Zhao et al. | |
| 2011/0023115 A1 | 1/2011 | Wright | |
| 2011/0283361 A1 | 11/2011 | Perdisci et al. | |
| 2011/0283391 A1* | 11/2011 | Eby | A01H 5/10 |
| | | | 800/263 |
| 2011/0296002 A1 | 12/2011 | Caram | |
| 2011/0296005 A1 | 12/2011 | Labovitz et al. | |
| 2012/0036577 A1* | 2/2012 | Bolzoni | H04L 43/00 |
| | | | 726/23 |
| 2012/0047248 A1 | 2/2012 | Makhija | |
| 2012/0096551 A1 | 4/2012 | Lee et al. | |
| 2012/0124087 A1 | 5/2012 | Malan et al. | |
| 2012/0167168 A1 | 6/2012 | Orr et al. | |
| 2012/0222119 A1 | 8/2012 | Huston | |
| 2012/0255023 A1 | 10/2012 | Maor et al. | |
| 2012/0284793 A1* | 11/2012 | Steinbrecher | H04L 63/1425 |
| | | | 726/23 |
| 2013/0031605 A1 | 1/2013 | Huston, III et al. | |
| 2013/0055374 A1 | 2/2013 | Kustarz et al. | |
| 2013/0055375 A1 | 2/2013 | Cline et al. | |
| 2013/0111019 A1 | 5/2013 | Tjew et al. | |
| 2013/0174260 A1 | 7/2013 | Amit et al. | |
| 2013/0198119 A1 | 8/2013 | Eberhardt, III et al. | |
| 2013/0263259 A1 | 10/2013 | Huston, III et al. | |
| 2014/0059199 A1 | 2/2014 | Do et al. | |
| 2014/0090061 A1 | 3/2014 | Avasarala et al. | |
| 2014/0113588 A1 | 4/2014 | Chekina et al. | |
| 2014/0149312 A1 | 5/2014 | Jennings et al. | |
| 2014/0149806 A1 | 5/2014 | Khalastchi et al. | |
| 2014/0317734 A1 | 10/2014 | Valencia et al. | |
| 2015/0026808 A1* | 1/2015 | Perdisci | H04L 63/145 |
| | | | 726/23 |
| 2015/0106927 A1 | 4/2015 | Ferragut et al. | |
| 2015/0286820 A1 | 10/2015 | Sridhara et al. | |
| 2015/0304349 A1 | 10/2015 | Bernstein et al. | |
| 2016/0019387 A1 | 1/2016 | Sol et al. | |
| 2016/0021124 A1 | 1/2016 | Sol et al. | |
| 2016/0226894 A1* | 8/2016 | Lee | H04L 63/1416 |

FOREIGN PATENT DOCUMENTS

| | | |
|---|---|---|
| GB | 2393607 | 3/2004 |
| GB | 2411315 | 8/2005 |
| WO | WO 0223808 | 3/2002 |
| WO | WO 03001333 | 1/2003 |
| WO | WO 03003210 | 1/2003 |
| WO | WO 03/067405 | 8/2003 |
| WO | WO 2004049627 | 6/2004 |
| WO | WO 2005006710 | 1/2005 |
| WO | WO 2013032774 | 3/2013 |
| WO | WO 2013032775 | 3/2013 |
| WO | WO 2013113532 | 8/2013 |
| WO | WO 2014/035386 | 3/2014 |

OTHER PUBLICATIONS

Bolzoni, D. et al., "Panacea: Automating Attack Classification for Anomaly-Based Network Intrusion Detection Systems", Sep. 23, 2009, Recent Advances in Intrusion Detection: 12th Int'l. Symposium, Raid 2009, St. Malo, France, Sep. 23-25, 2008, Proceedings, Springer Berlin Heidelberg, pp. 1-20.

Dedhia,"Bitdefender 60-Second Virus Scanner Review", Retrieved From: <http://www.blogsdna.com/20005/bitdefender-60-second-virus-scanner.htm> Mar. 11, 2015, Jan. 3, 2013, 5 pgs.

PCT International Search Report & Written Opinion Issued in PCT Application No. PCT/US2015/040086, Dated: Oct. 21, 2015, 11 Pages.

PCT International Search Report and Written Opinion in International Application PCT/US2016/016244, dated Apr. 18, 2016, 14 pgs.

PCT Search Report and Written Opinion dated Oct. 21, 2015 for PCT application No. PCT/US2015/040083, 12 pages.

Terran Lane; "Machine Learning Techniques for the Domain of Anomaly Detection for Computer Security", Purdue University, Jul. 16, 1998.

U.S. Appl. No. 14/333,377, Office Action dated Jan. 21, 2016, 13 pgs.

U.S. Appl. No. 14/519,062, Amendment and Response filed Jun. 8, 2016, 28 pgs.

U.S. Appl. No. 14/519,062, Office Action dated Jan. 21, 2016, 10 pgs.

(56) References Cited

OTHER PUBLICATIONS

Bazzoli, et al., "XSS Peeker: A Systematic Analysis of Cross-site Scripting Vulnerability Scanners", In Computing Research Repository, Retrieved on: Nov. 27, 2014, 20 pages.
Broadwell, Peter M., "Response Time as a Performability Metric for Online Services", In Technical Report No. UCB//CSD-04-1324, May 2004, 54 pages.
Brown, "Working with SEC—The Simple Event Correlator", Retrieved From: <http://simple-evcorr.sourceforge.net/SEC-tutorial/article.html> Apr. 24, 2014, Nov. 23, 2003, 29 Pages.
Brown, "Working with SEC—the Simple Event Correlator, Part Two", Retrieved From: <http://simple-evcorr.sourceforge.net/SEC-tutorial/article-part2.html> Apr. 24, 2014, Jul. 24, 2004, 27 Pages.
Chavan, et al., "Adaptive Neuro-Fuzzy Intrusion Detection Systems", In Proceedings of the International Conference on Information Technology: Coding and Computing, vol. 1, Apr. 5, 2004, 5 pages.
Dass, et al., "LIDS: Learning Intrusion Detection System", In Proceedings of the Sixteenth International Florida Artificial Intelligence Research Society Conference, May 12, 2003, 5 pages.
Dessiatnikoff, et al., "A Clustering Approach for Web Vulnerabilities Detection", In Proceedings of 17th IEEE Pacific Rim International Symposium on Dependable Computing, Dec. 12, 2011, 10 pages.
Elbachir, et al., "Web Application Attacks Detection: A Survey and Classification", In Proceedings of International Journal of Computer Applications, vol. 103, No. 12, Oct. 2014, 6 pages.
Mukkamala, et al., "Intrusion Detection using Neural Networks and Support Vector Machines", In Proceedings of the International Joint Conference on Neural Networks, vol. 2, May 12, 2002, 6 pages.
Polychronakis, et al., "An Empirical Study of Real-world Polymorphic Code Injection Attacks", In Proceedings of the 2nd USENIX conference on Large-scale exploits and emergent threats: botnets, spyware, worms, and more, Apr. 21, 2009, 9 pages.
Reavey, et al., "Operational Security for Online Services Overview", Available at: <http://download.microsoft.com/download/9/D/B/9DBA2020-5E81-4A54-8C5D-4938B0FAE042/Operational-Security-for-Online-Services-Overview.pdf>, Oct. 21, 2013, 10 Pages.
Rouillard, "Real-Time Log File Analysis using the Simple Event Correlator (SEC)", In Proceedings of the 18th USENIX conference on System Administration, Nov. 14, 2004, 18 Pages.
Stroeh, et al., "An Approach to the Correlation of Security Events based on Machine Learning Techniques", Available at: <http://download.springer.com/static/pdf/373/art%253A10.1186%252F1869-0238-4-7.pdf?auth66=1398335730_1698f19e7e31ee8e249648320b49dba7&ext=.pdf>, Mar. 2013, 16 Pages.
Suhina, et al., "Detecting vulnerabilities in Web applications by clustering Web pages", In Proceedings of 31st International Convention on Information and Communication Technology, Electronics and Microelectronics, May 26, 2008, 5 pages.
Turnbull, "Hardening Linux—Understanding Logging and Monitoring", In Proceedings: Apress, 1 edition, Jan. 25, 2005, 48 Pages. (5 pages).
Vaarandi, "SEC—A Lightweight Event Correlation Tool", In Proceedings: IEEE Workshop on IP Operations and Management, Oct. 29, 2002, 5 Pages.
Vaarandi, "SEC—Simple Event Correlator", Retrieved From: <http://simpleevcorr.sourceforge.net/> Apr. 22, 2014, Jan. 15, 2014, 2 pages.
Vaarandi, "Simple Event Correlator for Real-Time Security Log Monitoring", In Proceedings: Hakin9 Magazine, Jan. 1, 2006, 4 Pages.
Vaarandi, "SLCT—Simple Logfile Clustering Tool", Retrieved From: <http://ristov.users.sourceforge.net/slct/> Apr. 24, 2014, Jan. 20, 2010, 1 page.
Vaarandi, et al., "Security Event Processing with Simple Event Correlator", In Proceedings: Journal of ISSA, Aug. 2012, 8 pages.
Ye, "A Markov Chain Model of Temporal Behavior for Anomaly Detection", In Proceedings: The IEEE Workshop on Information Assurance and Security, Jun. 6, 2000, 4 Pages.
PCT 2nd Written Opinion in International Application PCT/US2016/016244, dated Jan. 16, 2017, 7 pgs.
U.S. Appl. No. 14/519,062, Office Action dated Sep. 22, 2016, 9 pgs.
U.S. Appl. No. 14/519,062, Amendment and Response filed Nov. 18, 2016, 10 pgs.
U.S. Appl. No. 14/519,062, Notice of Allowance dated Dec. 1, 2016, 9 pgs.
U.S. Appl. No. 14/333,377, Amendment and Response filed Jul. 21, 2016, 15 pgs.
U.S. Appl. No. 14/333,377, Notice of Allowance dated Aug. 19, 2016, 13 pgs.
U.S. Appl. No. 14/333,377, Amendment after Allowance filed Sep. 26, 2016, 9 pgs.
U.S. Appl. No. 14/333,377, USPTO Response dated Sep. 28, 2016, 1 page.
"International Preliminary Report on Patentability Issued in PCT Application No. PCT/US2016/016244", Dated: May 9, 2017, 8 Pages.
PCT International Preliminary Report on Patentability in PCT Application No. PCT/US2015/040086, Dated: Jan. 17, 2017, 9 Pages.
PCT International Preliminary Report on Patentability in PCT application No. PCT/ US2015/040083, Dated: Jan. 17, 2017, 9 pages.

\* cited by examiner

Mobile Computing Device

SECURITY SCANNER

BACKGROUND

Web application security scanners are used to detect security vulnerabilities in web applications. These security scanners perform "black box" testing, that is, these scanners have no knowledge of the internals of the web applications that they are testing. As such, these security scanners probe for various weaknesses on the visible "attack surface" of the web application.

It is with respect to these and other general considerations that embodiments disclosed herein have been made. Also, although relatively specific problems may be discussed, it should be understood that the embodiments should not be limited to solving the specific problems identified in the background or elsewhere in this disclosure.

SUMMARY

In summary, the disclosure generally relates to systems and methods for automated selection of payloads for use in a security scan of a web application by a security scanner. More specifically, the systems and methods disclosed herein test potential payloads for a security scan of a given web application on a test application with known security vulnerabilities, evaluate valid response returned by this test application, determine functionally equivalent responses, group payloads based the equivalence of their valid responses, and select one or more payloads from each created group for use in the security scan of the given web application. The systems and methods disclosed herein reduce processor load during scans, increase payload selection speed, improve the effectiveness of the security scans, and reduce network bandwidth.

One aspect of the disclosure is directed to a method for automated selection of payloads for a security scan of a web application by a security scanner. The method comprises: selecting a first set of payloads from a list of stored payloads; attacking a test target with the first set of payloads; and receiving a test response for each payload in the first set of payloads from the test target. The method further comprises: determining a second set of payloads that generated a valid test response from the test target; determining a symmetrical difference for each valid test response for the second set of payloads; and clustering the second set of payloads into groups. The clustering comprises: comparing each symmetrical difference to a configurable threshold; classifying payloads of the second set of payloads into one group when the payloads have valid test responses with symmetrical differences that are less than the configurable threshold; and classifying the payloads of the second set of payloads into different groups when the payloads have valid test responses with symmetrical differences that are more than the configurable threshold. The payloads within a same group are identified as functionally equivalent. The method additionally comprises selecting at least one payload from each group to form a third set of payloads and attacking a security target with the third set of payloads.

Another aspect of the disclosure includes a security scanner system. The security scanner system provides automated selection of payloads for a security scan. The security scanner system includes a computing device including a processing unit and a memory. The processing unit implements a scan system and an automated payload selection system. The automated payload selection system is operable: to receive new payloads; update a list of payloads based on the new payloads; store the list of payloads to form a list of stored payloads; select a first set of payloads from the list of stored payloads; attack a test target with the first set of payloads; receive a test response for each payload in the first set of payloads from the test target; determine a second set of payloads that generated a valid test response from the test target; determine a symmetrical difference for each valid test response for the second set of payloads; cluster the second set of payloads into groups based on the symmetrical differences for the valid test responses for the second set of payloads; and select at least one payload from each group to form a third set of payloads. The payloads within a same group are identified as functionally equivalent. The scan system is operable to attack a security target with the third set of payloads.

Yet another aspect of the disclosure includes a system for automated selection of payloads for a security scan. The system comprises at least one processor and one or more computer-readable storage media including computer-executable instructions stored thereon. The computer-executable instructions are executed by the at least one processor. The computer-executable instructions cause the system to perform operations including: receiving a security target; reading attack surfaces for the security target; determining attack types for the security target based on the attack surfaces; selecting a first set of payloads from a list of stored payloads based on the attack types; attacking a test target with the first set of payloads; receiving a test response for each payload in the first set of payloads from the test target; determining a second set of payloads that generated a valid test response from the test target; determining a symmetrical difference for each valid test response for the second set of payloads; and clustering the second set of payloads into groups based on the symmetrical difference for the valid test responses for the second set of payloads. The payloads within a same group are identified as functionally equivalent. The computer-executable instructions further cause the system to perform additional operations including: selecting at least one payload from each group to form a third set of payloads; attacking the security target with the third set of payloads; evaluating responses for each of the third set of payloads received from the security target; and generating a report based on the evaluating of the responses.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1:
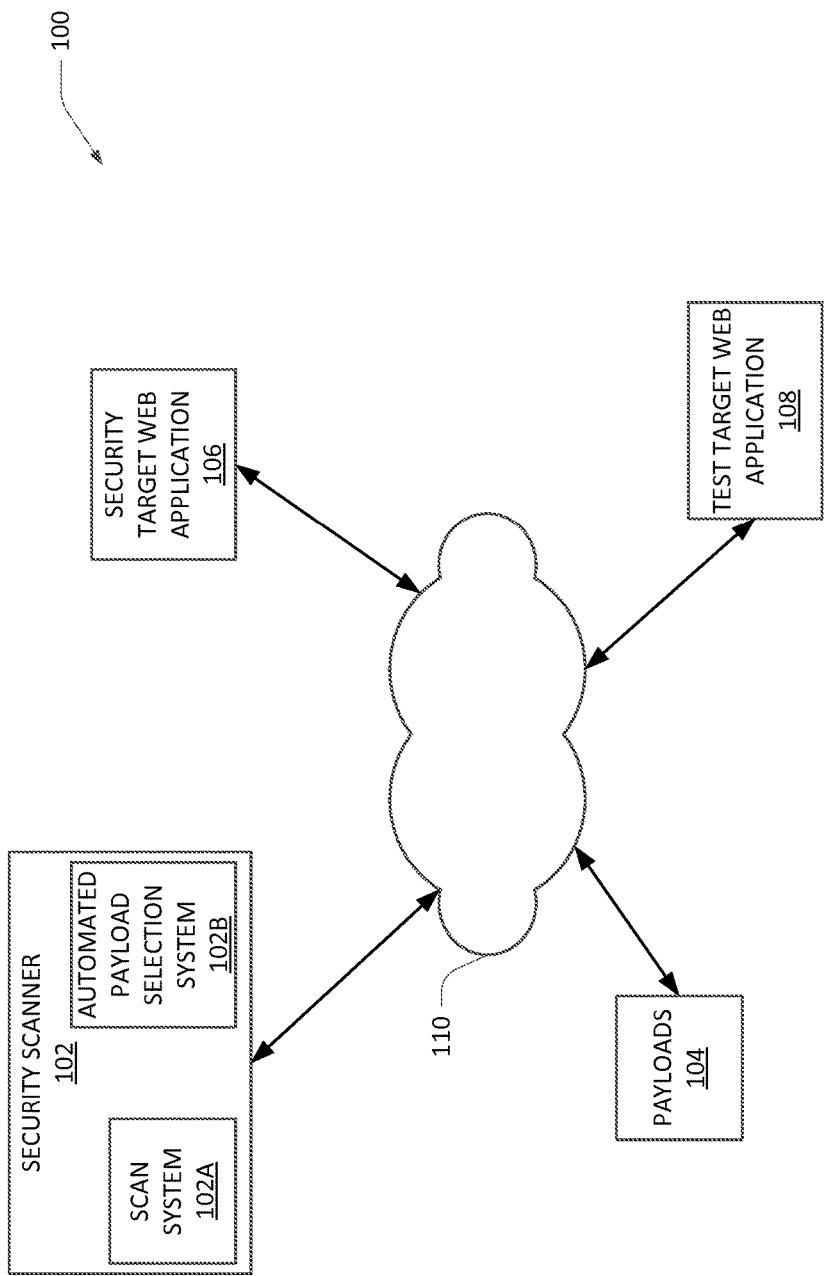
FIG. 1 is a block diagram illustrating an example of a system including a security scanner system and other components that communicate via the cloud.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

The free exchange of information facilitated by personal computers surfing over the Internet has spawned a variety of risks for the organizations that host that information and likewise, for those who own the information. This threat is most prevalent in interactive applications hosted on the World Wide Web and accessible by almost any personal computer located anywhere in the world. Web applications can take many forms: an informational Web site, an intranet, an extranet, an e-commerce Web site, an exchange, a search engine, a transaction engine, or an e-business. This list is exemplary only and is not meant to be limiting. These applications are typically linked to computer systems that contain security weaknesses that can pose risks to a company. Weaknesses can exist, for example, in system architecture, system configuration, application design, implementation configuration, operations, and/or etc. The risks, for example, may include the possibility of incorrect calculations, damaged hardware and software, data accessed by unauthorized users, data theft or loss, misuse of the system, disrupted business operations, and/or etc.

Security scanners are utilized to attack web applications to determine if these applications have any security vulnerabilities that could be exploited others. Security scanners may also provide a detailed analysis of the web application so that the web application may be modified to make the web application more secure. These security scanners have no knowledge of the internals of the web applications that they are testing. As such, these security scanners probe for various weaknesses on the visible "attack surface" of the web application. When attacking a web application, security scanners send special payloads in an attempt to trigger an unexpected behavior in the web application. These payloads are at the core of the security scanner.

There is almost an infinite number of payloads that can be generated, but only a select group of payloads may be utilized for any given security scan due to the limited resources of the security scanners and the web applications. The selection of this group of payloads for an attack is critical to the effectiveness of the security scan. Each payload checks for a specific security vulnerability. There are often time numerous different payloads that essentially check for the same security vulnerability or issue and are, therefore, considered to be functionally equivalent. Accordingly, the more payloads within a selected group that are functionally different, the more security issues or vulnerabilities that the security scanner can check. However, since there is an almost an infinite number of payloads, there is also an almost infinite number of combinations of payloads that could be utilized for an attack. Further, new payloads are continuously being found and/or created. Further, it is often difficult if not impossible to determine the functionality of a payload by merely looking at or studying the payload itself.

There is typically no system for automatically selecting payloads for a security scan that can effectively evaluate the mass number of known payloads, evaluate newly received payloads, and select a group of functionally different payloads in a comprehensive, timely, and cost efficient manner. While previous systems have attempted to select payloads with different functionalities, these systems lack the capability to automatically review the continuously growing almost infinite number of payloads in a timely and effective manner for selection of non-equivalent payloads as provided by the systems and methods disclosed herein. The systems and method disclosed herein are able to automatically review the continuously growing almost infinite number of payloads in a timely and effective manner for selection by testing potential payloads for a security scan of a given web application on a test application or test target with known security vulnerabilities and by evaluating the valid response returned by this test target and then grouping these evaluated valid responses into functionally equivalent groups. The systems and methods as utilized herein may then simply select one or more payloads from each group for a comprehensive security scan. While the payloads will often be selected at random by the systems and methods described herein, advantageously, the systems and methods described herein can select specific types of payloads from the groups, such as payloads with the fewest characters (reducing load), the oldest payloads, the easiest payloads for a human to read, the newest payloads, and/or target specific payloads.

The ability of the systems and methods described herein to automatically review the continuously growing almost infinite number of payloads in a timely and effective manner for selection of non-equivalent payloads reduces processor load during scans, increases payload selection speed, improves the effectiveness of the security scans, and reduces network bandwidth when compared to prior art methods that do not utilize this automated selection of the payloads.

Figure 2:
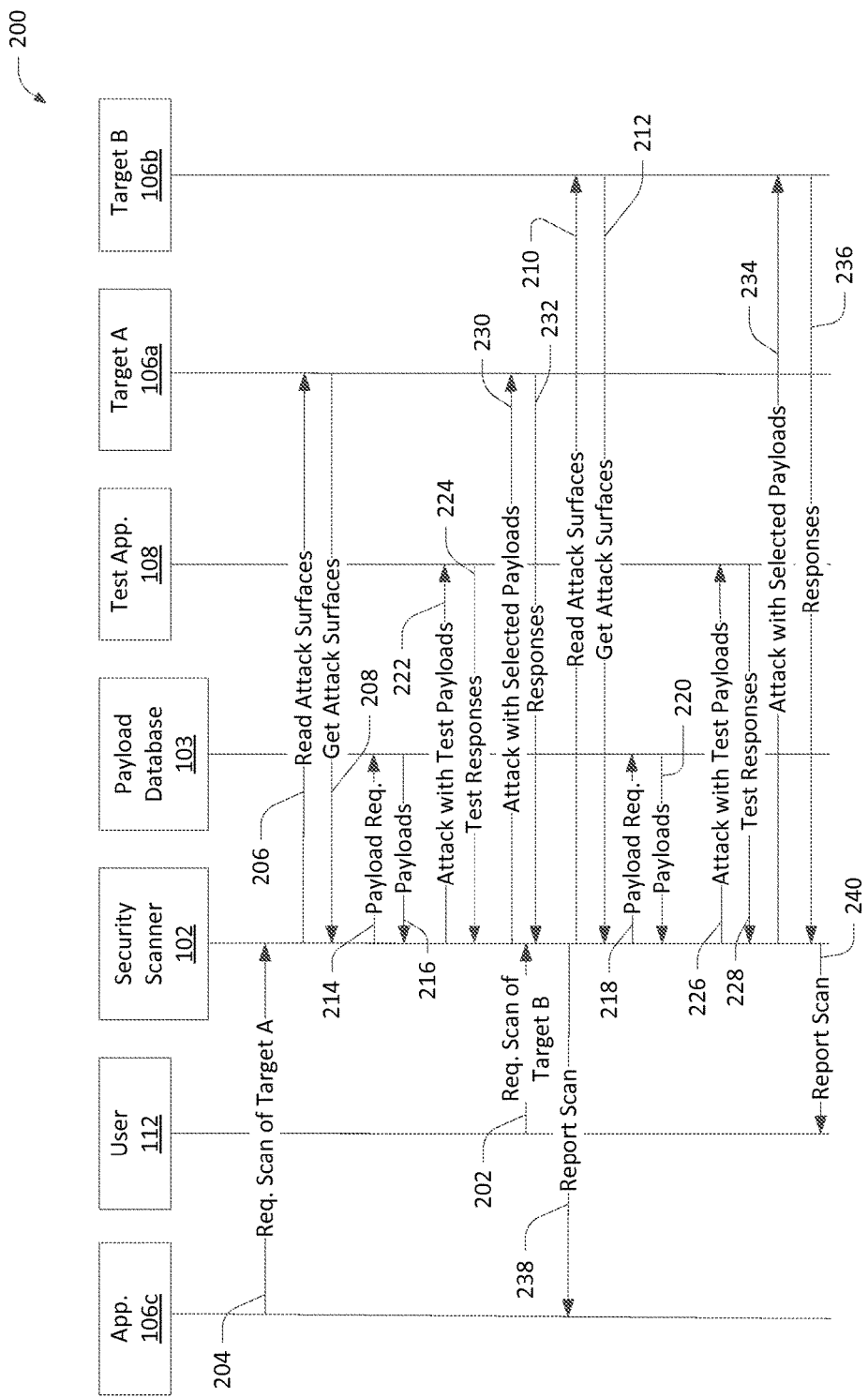
FIG. 2 is a schematic diagram illustrating an example of communication between a security scanner and various other components.

FIG. 1 generally illustrates an example of a system 100 including a security scanner 102 and other components that communicate via cloud 110. In the illustrated example, the communication means is illustrated as the "cloud" 110. While the communication means is shown as the cloud 110, those skilled in the art will appreciate that other suitable communication means may be utilized by the security scanner 102 and system 100 such as other communication networks including wired and/or wireless communication networks. FIG. 2 illustrates an example of communication 200 between a security scanner 102 and various other components The security scanner 102 as discussed above, attacks web applications 106 to determine and report security vulnerabilities. In some embodiments, the security scanner 102 comprises a scan system 102a and an automated payload selection system 102b. The scan system 102a and the automated payload selection system 102b communicate information and/or commands with each other. The automated payload selection system 102b is performs the automated selection of payloads for the security scan. The scan system 102a determines the security target, reads the security target, attacks the security target, and evaluates/determines the security flaws of the security target, and/or generating a report of the security flaws for the security target.

The security scanner 102 receives a request from another component to perform a security scan of specific web application 106. The component may be a user of the security scanner 102 or another application in communication with the security scanner 102. Further, the request may be input into the security scanner 102 by the user or may be received via any suitable communication system by the security scanner 102, such as the cloud 110 or a network communication system. As illustrated in FIG. 2, a user 112 sends a request 202 to scan web application target B 106*b* to security scanner 102. FIG. 2 further illustrates an application 106*c* sending a request 204 to the security scanner 102 to scan web application target A 106*a*.

In response to the received request, the scanner 102 communicates with the security target web application 106 to read the "attack surface" of the web application 106. In other words, the scanner 102 probes the web application 106 to determine all available inputs for the web application 106 and by identifying as much information or characteristics about these inputs as possible. For example, the scanner 102 may identify the characters allowed by the input(s), the maximum and minimum number of characters that are accepted by the input(s) and the manner in which the characters are treated by the web application. In some embodiments, the characteristics of the inputs are determined by examining the context of the inputs, the markup language associated with the input, the size of the input, and etc. In some embodiments, the inputs are a url parameter or a cell parameter. This list is exemplary only and is not meant to be limiting. Any suitable input for a web application may be determined by the security scanner. For example, a search engine web application will have different inputs than an e-business or e-commerce site.

As illustrated in FIG. 2, the scanner 102 sends a probe 206 to read the attack surface of web application target A 106*a* in response to request 204. In response to the probe 206, the security scanner 102 receives the inputs and characteristics about these inputs 208 for the web application target A 106*a* from the web application target A 106*a*. Similarly, as illustrated in FIG. 2 the scanner sends a probe 210 to read the attack surface of web application target B 106*b* in response to request 202. In response to the probe 210, the security scanner 102 receives the inputs and the characteristics of the inputs 212 for the web application target B 106*b* from the web application target B 106*b*. In some embodiments, the scanner 102 analyzes inputs and the characteristics of the inputs to determine the attack type for the security target 106. In other words, the scanner 102 analyzes the inputs and the characteristics of the inputs to determine the types of payloads that should be utilized to effectively attack the security target 106.

Payloads 104 are specifically crafted requests that were designed in an attempt to result in an unexpected behavior (or response) by a web application when input into the web application. The receipt of an unexpected response by the scanner 102 from the test target 108 from a sent payload informs the security scanner 102 of a potential security vulnerability. Accordingly, each payload checks for a specific security vulnerability or issue. As discussed above, several different payloads 104 may check for security vulnerabilities that are functionally the same and are referred to herein as functionally equivalent. Payloads that check for security vulnerabilities that are functionally different are referred to herein as functionally different, functionally not equivalent, or functionally inequivalent.

In some embodiments, the security scanner 102 stores a list of all payloads 104 the scanner 102 receives or finds. As discussed above new payloads are constantly being created or found. In these embodiments, the security scanner 102 updates the list of payloads with any new payloads the security scanner 102 finds or receives to form a list of stored payloads. Accordingly, the stored list of payloads is continuously updated by the security scanner with newly received and/or found payloads. In these embodiments, the security scanner 102 selects a set of payloads from the list of stored payloads based on the input characteristics of the next web application the scanner is going to scan (referred to herein as a security target).

The security target may be any interactive web application. In some embodiments, the security target is an email application, a social networking application, a collaboration application, an enterprise management application, a messaging application, a word processing application, a spreadsheet application, a database application, a presentation application, a search engine, a contacts application, a calendaring application and/or a gaming application. This is list exemplary only and is not meant to be liming. Any suitable interactive web application may be the security target of the scanner 102.

In other embodiments, the security scanner 102 communicates via a communication system, such as the cloud 110, with a databased of payloads 103. The database of payloads 103 is updated with any new payloads the database 103 finds or receives to form a list of stored payloads. Accordingly, the list of stored payloads is continuously updated by the database 103. In these embodiments, the scanner 102 requests a set of payloads from the database 103 based on the input characteristics of the security target 106. The security scanner 102 receives the requested set of payloads from the database 103 in response to the scanner's request. FIG. 2 illustrates an example of scanner 102 sending a request 214 to a payload database 103 for a set of payloads based on the attack type (or inputs and input characteristics) of the security target of web application target A 106*a*. Further, FIG. 2 illustrates an example of scanner 102 receiving the requested set of payloads 216 based on the attack type of web application target A 106*a* from the payload database 103. Additionally, FIG. 2 illustrates an example of scanner 102 sending a request 218 to a payload database 103 for a set of payloads based on the input characteristics of web application target B 106*b*. If the payload database 103 received any new payloads since request 214, these new payloads if relevant based on the input characteristics of web application target B 106*b* will be automatically included in set of payloads 220 received by the security scanner 102 in response to the new request 218 from the database 103.

Once the security scanner 102 has determined or received the requested set of payloads (also referred to herein as test payloads) based on the security target's attack type, the scanner 102 sends the test payloads to a test application 108 (also referred to herein as a test target 108). The test application 108 is a web application with known security flaws or vulnerabilities by the security scanner 102. The test target may be any interactive web application. In some embodiments, the test target is an email application, a social networking application, a collaboration application, an enterprise management application, a messaging application, a word processing application, a spreadsheet application, a database application, a presentation application, a search engine, a contacts application, a calendaring application and/or a gaming application. This is list exemplary only and is not meant to be liming. Any suitable interactive web application may be the test target by the scanner 102.

In some embodiments, the test application 108 is created by the security scanner 102. In further embodiments, the security scanner 102 creates the test application 108 with known security flaws based on the identified input characteristics or the attack type of the security target. In alternative embodiments, the security scanner 102 utilizes an already created web application that has known security flaws. In further embodiments, the security scanner 102 selects the test application 108 with known security flaws based on the identified input characteristics or the attack type of the security target. FIG. 2 illustrates the security scanner 102 sending the test payloads 222 for Target A 106a to the test application 108 to attack the test application 108. Further, FIG. 2 illustrates sending the test payloads 226 for Target B 106b from the scanner 102 to the test application 108 to attack the test application 108.

The scanner 102 receives test responses from the test application for each test payload sent to the test application for each input of the test application. Accordingly, if the test application has three inputs, one sent test payload by the scanner 102 will return three responses from the test application 108, while three sent test payloads to the test application 108 will return nine responses to the scanner 102. FIG. 2 illustrates the security scanner 102 receiving test responses 224 for each test payload selected based on target A 106 from the test application 108. Further, FIG. 2 illustrates the security scanner 102 receiving test responses 228 for each test payload selected based on target B 106b from the test application 108.

The scanner 102 filters the received test responses to determines all of the valid test responses received from the test application 108. Valid test responses are responses that returned results from the test application 108. Invalid test responses are responses that generated some type of server error. Accordingly, invalid test responses provide information about the server and do not provide any information about the security of the test application 108. For example, a response with a HTTP status 200 is a valid response, while a response with a server error 401 is an invalid response.

The security scanner 102 groups the payloads with valid response. The security scanner 102 groups the payloads by calculating a deviation score using a behavior change (volatility) detection system. The behavior change (volatility) detection system utilizes hierarchical clustering (agglomerative approach) algorithm to classify the similarity between a set of items. In other words, the system models the behavior of valid test response for a first set time period and for a different but equivalent second set time period. The system compares the deviation for each response between the two different time periods to determiner a symmetrical difference for each valid test response.

Once the symmetrical difference for each test response has been determined, the scanner 102 compares each symmetrical difference to a configurable threshold. Valid responses with a symmetrical difference that is less than the configurable threshold are considered to be from payloads that are functionally equivalent and are therefore classified into the same group by the scanner 102. Valid responses with a symmetrical difference that is more than the configurable threshold are considered to be from payloads that are functionally inequivalent and are therefore are classified into different groups by the scanner 102. Accordingly, payloads placed into the same group by the behavior change (volatility) detection system running on the scanner 102 are identified as functionally equivalent.

The configurable threshold determines how similar responses from test payloads have to be, in order to be identified as functionally equivalent. As such, the configurable threshold may be adjusted by scanner 102 as needed. In some embodiments, the scanner 102 adjusts the configurable threshold based on the bandwidth of the communication means, the capacity of the scanner 102, and/or the capacity of the target application. The higher the configurable threshold, the lower the number of groups and the larger the number of payloads in each group that are formed by the behavior change (volatility) detection system running on the scanner. The lower the configurable threshold, the higher the number of groups and the lower the number of payloads in each group that are formed by the behavior change (volatility) detection system running on the scanner. For example, some security targets may have a larger capacity than others. As such, a greater number of payloads may be utilized to attack these larger capacity security targets. Accordingly, in these embodiments, the scanner 102 may form a larger number of groups by adjusting the configurable threshold.

In some embodiments, the configurable threshold is determined by the scanner 102. In other embodiments, the configurable threshold is received by the scanner 102 from a user or a web application.

Once the behavior change (volatility) detection system running on the scanner 102 has formed different groups, the scanner 102 selects at least one payload from each group. A payload selected from one group should be functionally different from any payload selected from another group. Accordingly, in some embodiments, the scanner 102 may select the one or more payload from each group at random. In other embodiments, the scanner 102 may select specific payloads for each group. For example, the scanner 102 may select payloads with the fewest characters, that are the easiest for humans to read, that are oldest, that are newest, and/or that are particularly related or relevant to the security target.

The scanner 102 attacks the security target 106 by sending the selected payloads to the security target 106. The scanner 102 receives a response for each selected payload for each determined input of the security target 106. FIG. 2 illustrates the scanner 102 sending the selected payloads 230 to web application security target A 106a to attack target A 106a and the scanner 102 sending the selected payloads 234 to web application security target B 106b to attack target B 106b. Additionally, FIG. 2 illustrates the security scanner 102 receiving the responses 232 for each sent payload for each input of web application target A 106a and illustrates the security scanner 102 receiving the responses 236 for each sent payload for each input of web application target B 106b.

The scanner 102 evaluates the received responses from the security target 106. The scanner 102 determines if any security vulnerabilities or issues are present in the security of the security target 106 based on this evaluation. For example, unexpected valid responses from the security target may be heavily analyzed or scrutinized to determine is these unexpected responses are a potential security issue or vulnerability.

After the evaluation, the scanner 102 generates a report about the security issues and/or vulnerabilities of the security target 106. The report may be stored by the scanner 102 or another database and/or sent to the component that requested the security scan of the given security target 106. FIG. 2 illustrates the scanner 102 sending the report 238 regarding the security scan of web application target A 106a to the application 106c that requested the security scan of the web application target A 106a. Additionally, FIG. 2 illustrates the scanner 102 sending the report 240 regarding the security scan of web application target B 106b to the user 112 that requested the security scan of the web application target B 106b.

Figure 3:
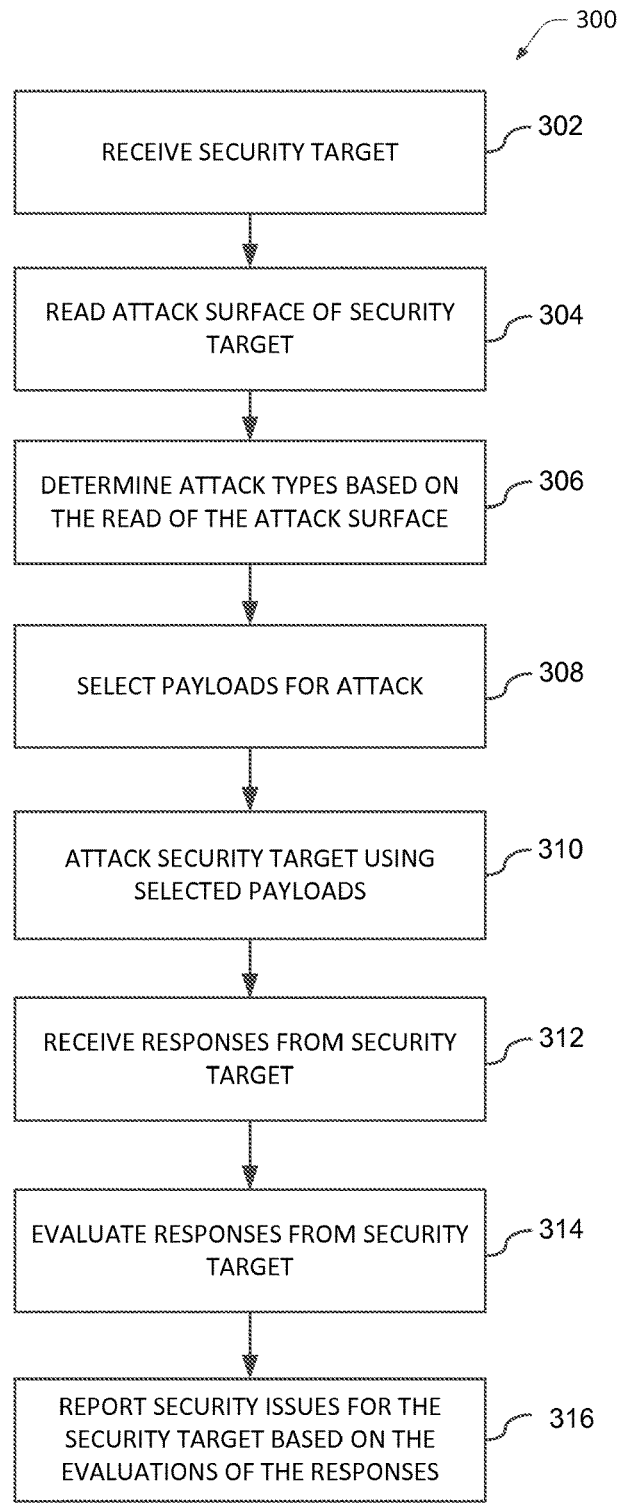
FIG. 3 is a flow diagram illustrating an example of a method for security scanning a web application.

FIG. 3 is a flow diagram conceptually illustrating an example of a method 300 for security scanning a web application. In some embodiments, method 300 is performed by a security scanner 102. In other embodiments, method 300 is performed by scan system 102a and an automated payload selection system 102b. In further embodiments, method 300 is performed by a computing device, a mobile computing device, or via a network of remote servers and/or remote computing devices. Method 300 tests potential payloads for a security scan of a given web application on a test application with known security vulnerabilities, by evaluating the valid response returned by this test application, by grouping these evaluated valid responses into functionally equivalent groups, and by selecting one or more payloads for use in the security from each group. Accordingly method 300 reduces processor load during scans, increases payload selection speed, improves the effectiveness of the security scans, and reduces network bandwidth.

At operation 302, a security target is received. The security target may be received via a communication means or via direct input. The security target may be any interactive application hosted on the World Wide Web (or web application). Web applications can take many forms, such as an informational Web site, an intranet, an extranet, an e-commerce Web site, an exchange, a search engine, a transaction engine, or an e-business. Web applications are typically linked to computer systems that contain security weaknesses that can pose risks to a company. Security weaknesses may exist in system architecture, system configuration, application design, implementation configuration, operations, and/or etc. The risks include the possibility of incorrect calculations, damaged hardware and software, data accessed by unauthorized users, data theft or loss, misuse of the system, disrupted business operations, and/or etc. Method 300 is performed to determine any potential security weaknesses or vulnerabilities for a give web application.

At operation 304 the attack surface of the security target is read or determined Operation 304 reads the attack surface by determining all available inputs for the security target and by identifying as much information or characteristics about these inputs as possible. For example, operation 304 may identify the characters allowed by the input(s), the maximum and minimum number of characters that are accepted by the input(s) and the manner in which the characters are treated by the security target. In some embodiments, at operation 304 the characteristics of the inputs are determined by examining the context of the inputs, the markup language associated with the input, and/or the size of the input.

One or more attack types are identified based on the read of the attack surface at operation 306. As discussed above, operation 304 identified characteristics about the inputs of the security target. The attack types are the types of payloads that will be useful in attacking the security target. For example, search string type payloads may be identified as the attack type during operation 306 based on operation 304 identifying that the attack surface (or input) of the security target is a queue for a search engine.

Figure 4:
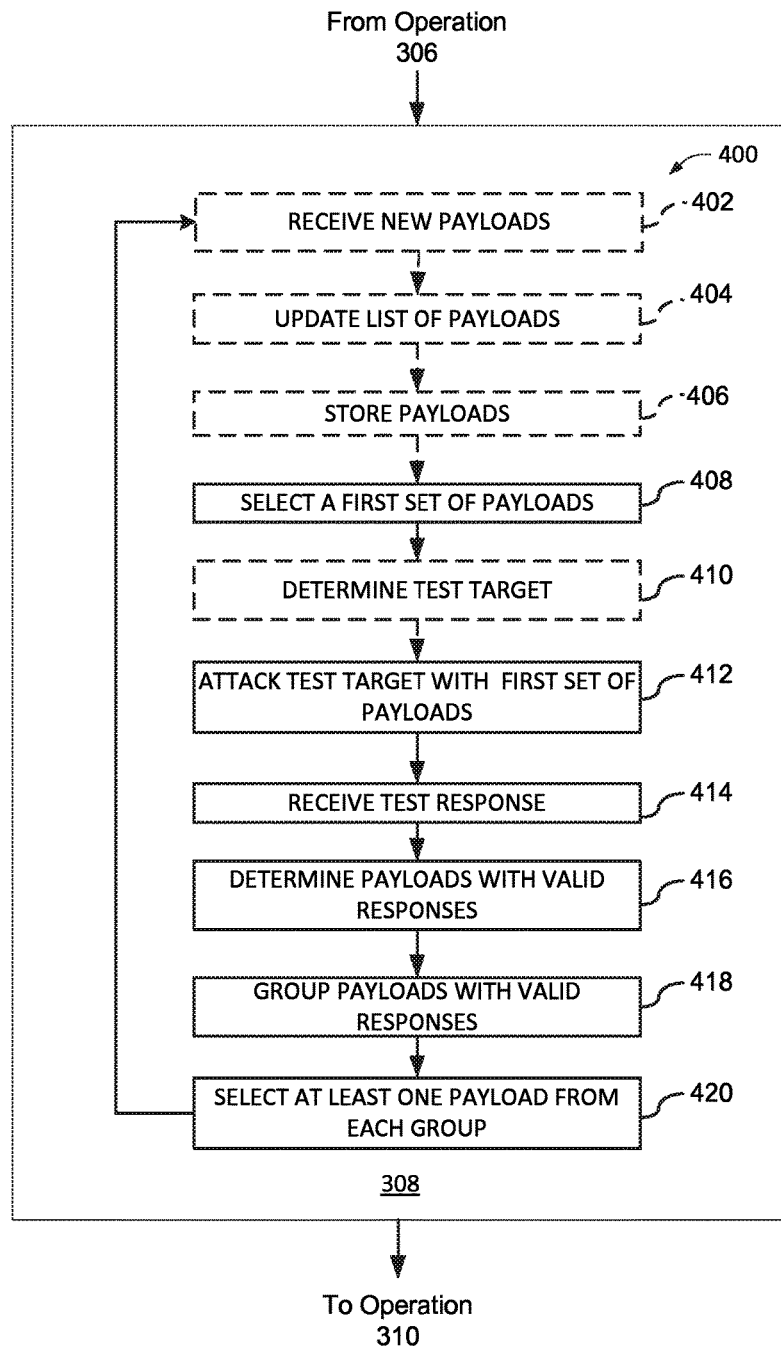
FIG. 4 is a flow diagram illustrating an example of a method for selecting payloads for a security scan.

Payloads are selected for attacking the security target during operation 308. At operation 308 a method 400 for automated selection of payloads may be performed, as illustrated in FIG. 4. Method 400 includes a select test operation 408, a test attack operation 412, a test receive operation 414, a valid test response operation 416, a group operation 418, and selection operation 420. In some embodiments, method 400 includes a new payload operation 402, a payload update operation 404, a payload store operation 406, and/or a test target operation 410.

In some embodiments, new payloads are received at operation 402. As discussed above new payloads are continuously being created or discovered. In further embodiments, at operation 404 a list of payloads is updated with any newly received payloads. In additional embodiments, the updated list is stored to form a list of stored payloads at operation 406.

A first set of payloads are selected at operation 408. In some embodiments, the first set of payloads is selected from the list of stored payloads from operation 406. In other embodiments, operation 408 sends a request for a first set of payload to a payload database and then receives, in response to the request, the first set of payloads from the payload database. The payload database includes a list of store payloads. The list of stored payloads is continuously updated based on any newly received or determined payloads. Accordingly, the list of stored payloads in continuously updated and forever growing.

As discussed above, an almost infinite number of payloads exist. Due to limited resources not all of these payloads can be tested during operation 308. However, not all of the payloads are relevant or appropriate for to the given security target. Accordingly, in some embodiments, the first set of payloads is selected based at least on the attack types determined during operation 306 during operation 408. Selecting payloads based on the attack type helps to ensure that the payloads in the first set of payloads will be relevant and appropriate for the inputs of the given security target.

In some embodiments, a test target is determined at operation 410. The test target is a web application with known security issues (also referred to herein as vulnerabilities or flaws). In some embodiments, the test target is selected from existing web applications that have known flaws during operation 410. In these embodiments, the existing web application may be selected based on the attack surfaces of the security target during operation 410. In alternative embodiments, the test target is created during operation 410. The test web application created during operation 410 is created to have known security issues. In these embodiments, the created web application may be created with specific inputs and/or specific security flaws based at least on the attack surfaces of the security target during operation 410.

At operation 412 the test target is attacked with the first set of payloads. Accordingly, each payload of the first set of payloads is sent to test target and entered into each input of the test target during operation 412. At operation 414 test responses from the test target are received. A test response for each payload from the first set of payloads is received from the test target during operation 412. In some embodiments, a test response for each payload from the first set of payloads for each input from the test target is received during operation 412

A second set of payloads are determined at operation 416. The test responses are reviewed to determine the valid test response during operation 416. Payloads that generated valid test response are selected to create the second set of payload during operation 416. Accordingly, the second set of payloads as determined at operation 416 includes any payload that generated a valid test response from the test target. Payloads that generated invalid test responses from the test target are filtered out and are not included in the second set of payloads during operation 416.

Figure 5:
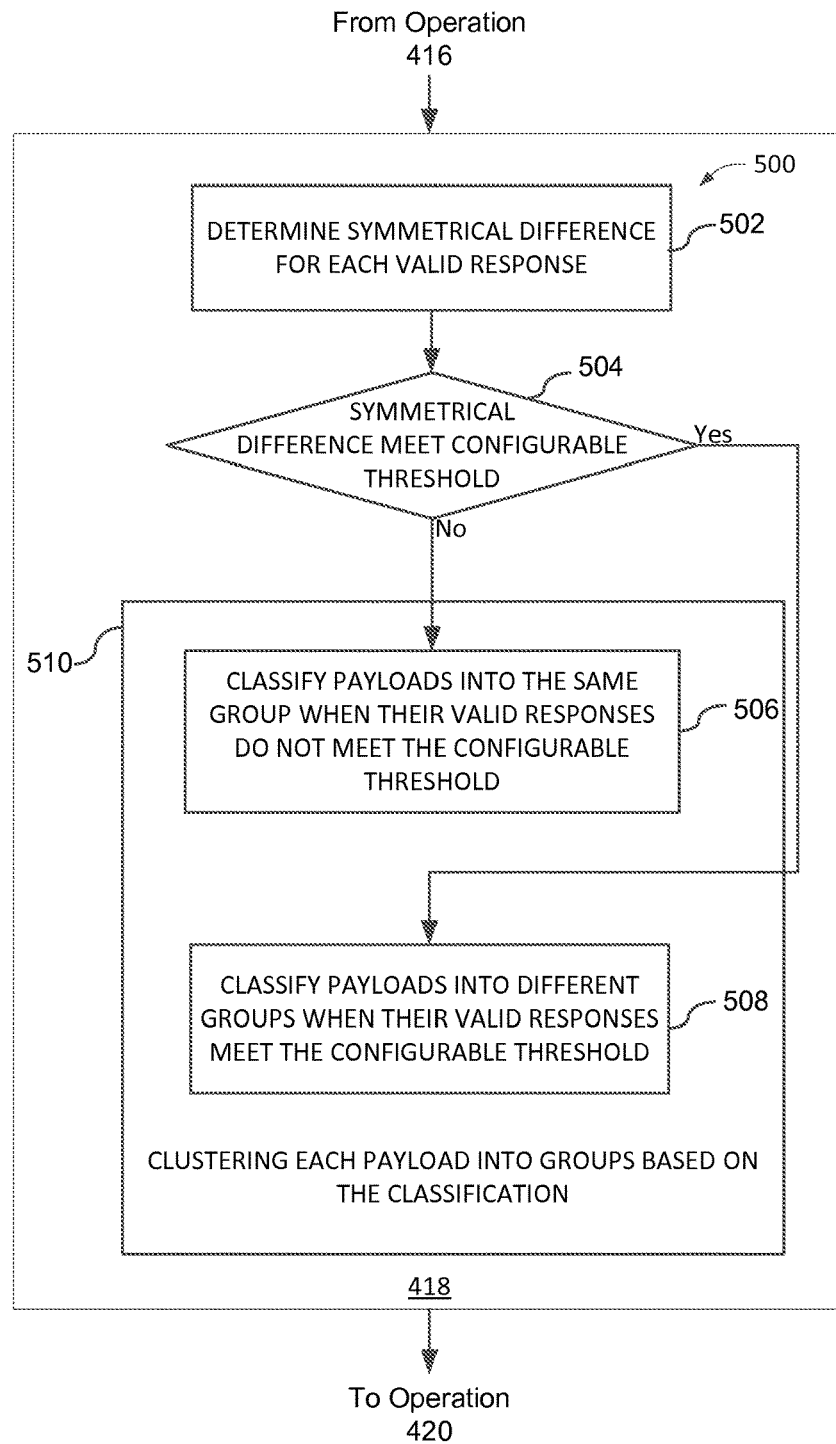
FIG. 5 is a flow diagram illustrating an example of a method for grouping functionally equivalent payloads.

At operation 418 the second set of payloads are clustered into groups. Each group created during operation 418 includes payloads from the second set of payloads that are identified as having functionally equivalent responses from the test target. Payloads placed into different groups during operation 418 are identified as having responses from the test target that are not functionally equivalent. At operation 418 a method 500 for grouping payloads may be performed, as illustrated in FIG. 5. Method 500 includes a difference operation 502, a compare operation 504, a same group classify operation 506, different group classify operation 508 and/or cluster operation 510.

At operation 502 a symmetrical difference for each payload with a valid response from the test target is determined. In some embodiments, a deviation score is calculated using a behavior change (volatility) detection system during operation 502. The behavior change (volatility) detection system utilizes a hierarchical clustering (agglomerative approach) algorithm to classify the similarity between a set of items. In other words, the system models the behavior of valid test responses for a first set time period and for a different but equivalent second set time period. The system compares the deviation score for each response between the two different time periods to determiner a symmetrical difference for each valid test response.

The symmetrical difference for each valid response from the test target is compared to a configurable threshold at operation 504. The payloads from the second set of payloads are clustered into groups based on the results of the comparison in operation 504 at operation 510. Operation 510 includes operation 506 and operation 508. If it is determined during operation 504 that the symmetrical difference is less than or does not meet the configurable threshold, operation 506 is performed. If it is determined during operation 504 that the symmetrical difference is more than or meets the configurable threshold, operation 506 is performed.

At operation 506 response payloads with responses from the test target that have symmetrical differences that do not meet the configurable threshold are identified as functionally equivalent and are classified into the same group. At operation 506 response payloads with responses from the test target that have symmetrical differences that meet the configurable threshold are identified as functionally inequivalent and are classified into different groups.

After the responses from the second set of payloads have been placed into groups by operation 418, operation 420 is performed. At operation 420 at least one payload from each group is selected to form a third set of payloads. In some embodiments, the payloads are selected from each group at random during operation 420. In other embodiments, the one or more payloads are selected based on one or more selection criteria during operation 420. The selection criteria may include selecting payloads based on the number characters in the payload, the age of the payload, how easy it is for a human to read the payload, and/or based on the security target. The third set of payloads determined during operation 420 are the payloads selected by operation 308.

At operation 310 the security target is attacked using the selected payloads from operation 308. The security target is attacked by sending each selected payload to the security target and entering each selected payload into each input of the security target during operation 310. The security target generates a response based on each payload entered into each input. At operation 312 the responses from the security target for each payload is received. In some embodiments, at operation 312 the responses from the security target for each payload for each input is received.

The responses from the security target are evaluated to determine the security issues of the security target during operation 314. The security issues are determined during operation 314 by analyzing the valid responses from the security target that show unexpected behavior. A report of the determined security issues is created during operation 316. In some embodiments, the report is stored during operation 314. In other embodiments, the report is sent to the user or web application that requested the security scan during operation 314.

In some embodiments, method 300 is performed by a security scanner 102. In some embodiments, the security scanner 102 comprises a scan system 102*a* and an automated payload selection system 102*b*. In additional embodiments, the scan system 102*a* performs operation 302, operation 304, operation 306, operation 310, operation 312, operation 3142, and operation 316 of method 300. In further embodiments, the automated payload selection system 102*b* performs operation 308 of method 300, operations 402-420 of method 400, and/or operations 502-508 of method 500.

In some embodiments, a security scanner system that automatically selects payloads for a security scan is disclosed. This security scanner system includes means for selecting a first set of payloads from a list of stored payloads, means for attacking a test target with the first set of payloads, means for receiving a test response for each payload in the first set of payloads from the test target, means for determining a second set of payloads that generated a valid test response from the test target, and means for determining a symmetrical difference for each valid test response for the second set of payloads. The security system scanner also includes means for clustering the second set of payloads into groups. The means for clustering includes means for comparing each symmetrical difference to a configurable threshold, means for classifying the payloads of the second set into one group when the payloads have valid test responses with symmetrical differences that are less than the configurable threshold, and means for classifying the payloads of the second set into different groups when the payloads have valid test responses with symmetrical differences that are more than the configurable threshold. The payloads within each group are identified as functionally equivalent. The security scanner system further includes means for selecting at least one payload from each group to form a third set of payloads and means for attacking a security target with the third set of payloads.

In other embodiments, a security scanner system that automatically selects payloads for a security scan is disclosed. The security scanner system includes means for receiving new payloads, means for updating a list of payloads based on the new payloads, means for storing the list of payloads to form a list of stored payloads, means for selecting a first set of payloads from the list of stored payloads, and means for attacking a test target with the first set of payloads. The security scanner system also includes means for receiving a test response for each payload in the first set of payloads from the test target, means for determining a second set of payloads that generated a valid test response from the test target, means for determining a symmetrical difference between each valid payload test response for the second set of payloads, and means for clustering the second set of payloads into groups based on the symmetrical difference between each valid payload test response for the second set of payloads. The payloads within each group are identified as functionally equivalent. The security scanner system further includes means for selecting at least one payload from each group to form a third set of payloads and means for attacking a security target with the third set of payloads. In some embodiments, the security scanner system further includes means for evaluating responses for each of the third set of payloads from the security target and/or means for generating a report based on the evaluation.

Figure 6:
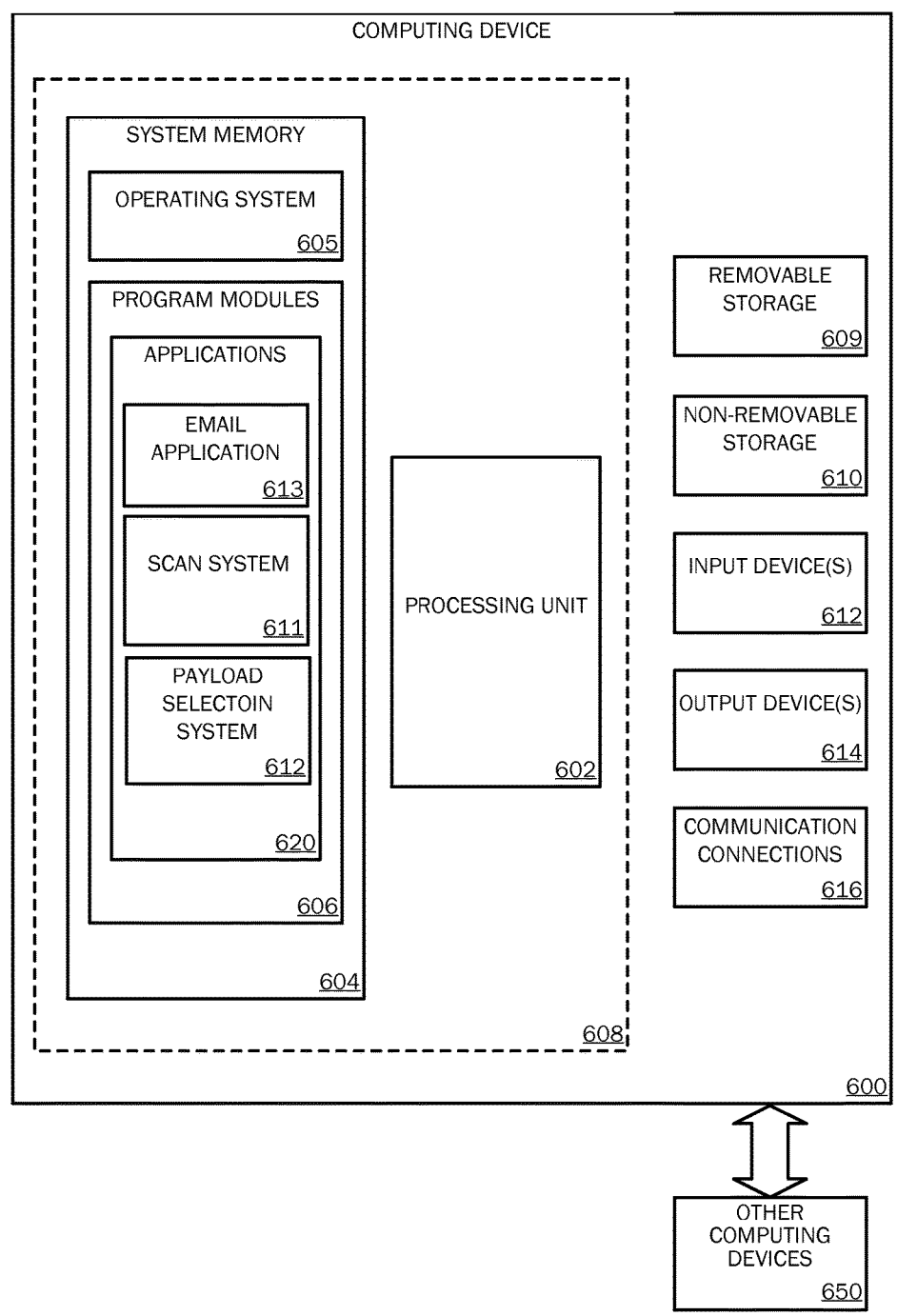
FIG. 6 is a block diagram illustrating example physical components of a computing device with which embodiments of the disclosure may be practiced.

FIGS. 6-9 and the associated descriptions provide a discussion of a variety of operating environments in which embodiments of the disclosure may be practiced. However, the devices and systems illustrated and discussed with respect to FIGS. 6-9 are for purposes of example and illustration and are not limiting of a vast number of computing device configurations that may be utilized for practicing embodiments of the disclosure, described herein FIG. 6 is a block diagram illustrating physical components (e.g., hardware) of a computing device 600 with which embodiments of the disclosure may be practiced. For example, the scan system 611 and/or the automated payload selection system 612 could be implemented by the computing device 600. The computing device components described below may include computer executable instructions for a scan module 611 and/or the automated payload selection module 612 that can be executed to employ the method 300 and implement portions of the system 100 disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as scan module 611 and/or the automated payload selection module 612. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. For example, payloads 104 and reported generated by scan module 611 could be stored on any of the illustrated storage devices.

As stated above, a number of program modules and data files may be stored in the system memory 604. While executing on the processing unit 602, the program modules 606 (e.g., scan module 611, the automated payload selection module 612, or email application 613) may perform processes including, but not limited to, performing method 300, method 400, and/or method 500 as described herein. For example, the processing unit 602 may implement a scan module 611 and/or the automated payload selection module 612. In some embodiments, scan module 611 includes the automated payload selection module 612. Other program modules that may be used in accordance with embodiments of the present disclosure, and in particular to generate screen content, may include electronic mail and contacts applications, word processing applications, spreadsheet applications, database applications, slide presentation applications, drawing, messaging applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
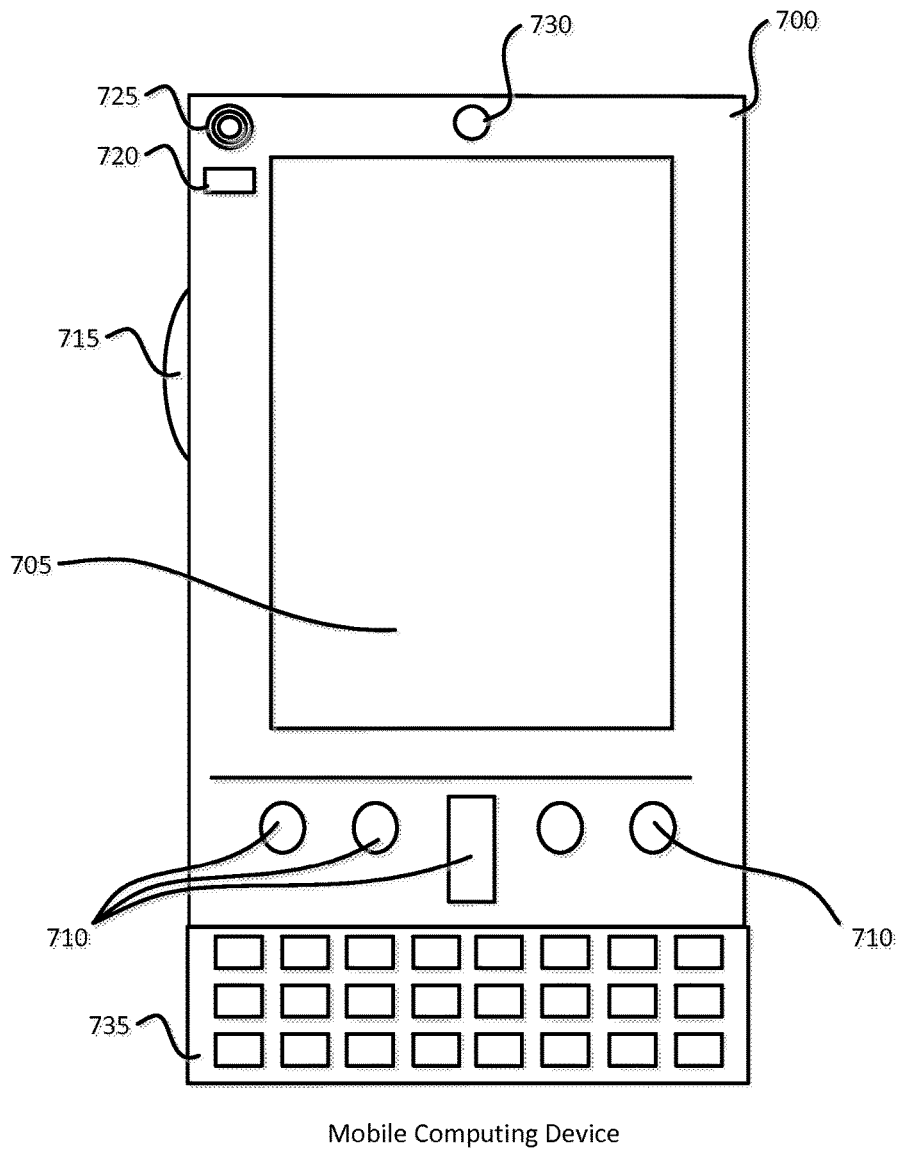
FIGS. 7A and 7B are simplified block diagrams of a mobile computing device with which embodiments of the present disclosure may be practiced.
Figure 7B:
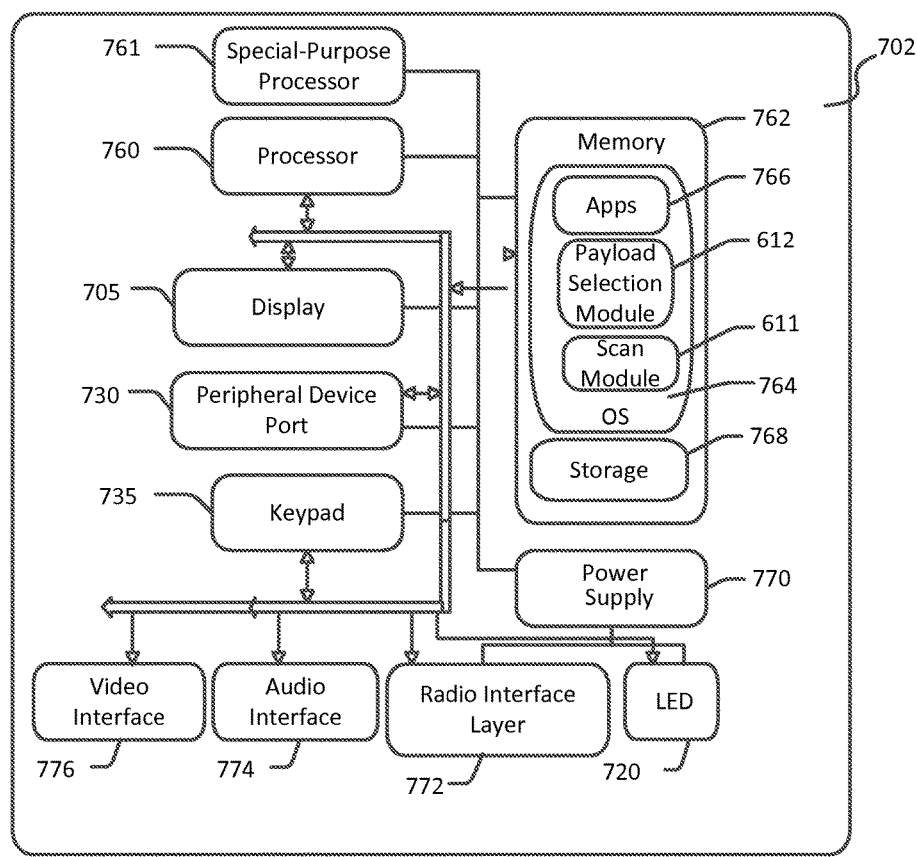

FIGS. 7A and 7B illustrate a mobile computing device 700, for example, a mobile telephone, a smart phone, wearable computer (such as a smart watch), a tablet personal computer, a laptop computer, and the like, with which embodiments of the disclosure may be practiced. With reference to FIG. 7A, one embodiment of a mobile computing device 700 suitable for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In addition to, or in place of a touch screen input device associated with the display 705 and/or the keypad 735, a Natural User Interface (NUI) may be incorporated in the mobile computing device 700. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various embodiments, the output elements include the display 705 for showing a graphical user interface (GUI). In embodiments disclosed herein, the various user information collections could be displayed on the display 705. Further output elements may include a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (e.g., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766, scan module 611 and/or the automated payload selection module 612 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape.

Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
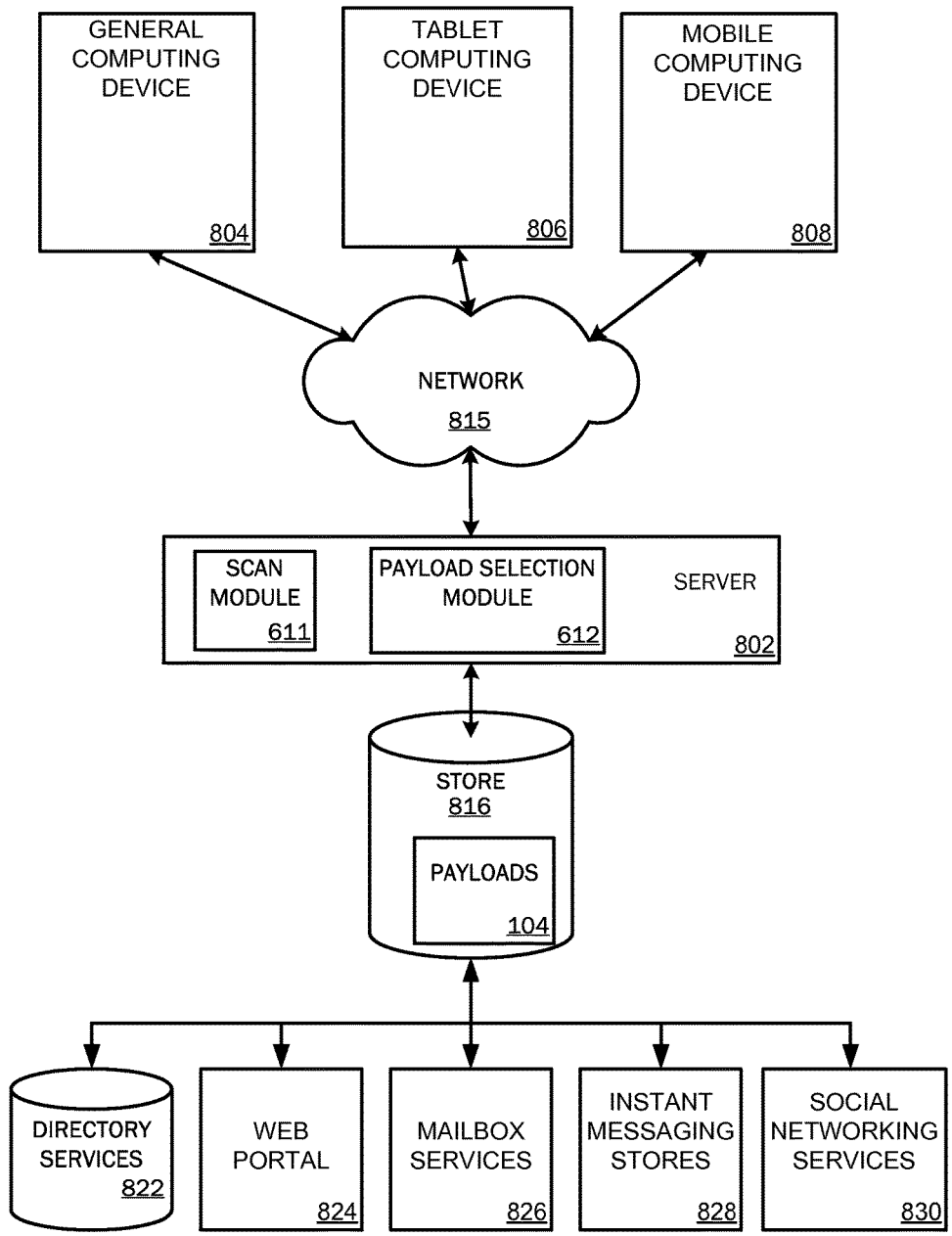
FIG. 8 is a simplified block diagram of a distributed computing system in which embodiments of the present disclosure may be practiced.

FIG. 8 illustrates one embodiment of the architecture of a system for processing data received at a computing system from a remote source, such as a general computing device 804, tablet 806, or mobile device 808, as described above. Content displayed at server device 802 may be stored in different communication channels or other storage types. For example, various documents may be stored using a directory service 822, a web portal 824, a mailbox service 826, an instant messaging store 828, or a social networking site 830.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary embodiments were provided so that this disclosure was thorough and complete and fully conveyed the scope of the other possible embodiments to those skilled in the art. For example, aspects of the various embodiments disclosed herein may be modified and/or combined without departing from the scope of this disclosure.

Although specific embodiments were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

The invention claimed is:

1. A security scanner system that provides automated selection of payloads for a security scan, the security scanner system comprising:
 a computing device including a processing unit and a memory, the processing unit implementing a scan system and an automated payload selection system, the automated payload selection system is operable to:
 receive new payloads;
 update a list of payloads based on the new payloads;
 store the list of payloads to form a list of stored payloads;
 select a first set of payloads from the list of stored payloads;
 attack a test target with the first set of payloads;
 receive a test response for each payload in the first set of payloads from the test target;
 determine a second set of payloads from the first set of payloads that generated a valid test response from the test target;
 determine a symmetrical difference for each valid test response for the second set of payloads;
 cluster the second set of payloads into groups based on the symmetrical differences for the valid test responses for the second set of payloads, wherein payloads within a same group are identified as functionally equivalent; and
 select at least one payload from each group to form a third set of payloads,
 wherein selecting at least one payload from each group to form the third set of payloads includes selecting the payloads at random; and
 the scan system is operable to:
 attack a security target with the third set of payloads.

2. The system of claim 1, wherein the automated payload selection system is further operable to:
 continuously update the third set of payloads based on the new payloads.

3. The system of claim 1, wherein the automated payload selection system reduces processor load, increases payload selection speed, improves security scans, and reduces network bandwidth when compared to security scanners that do not utilize the automated selection of payloads for the security scan.

4. The system of claim 1, wherein the scan system is further operable to:
 receive the security target;
 read attack surfaces for the security target;
 determining attack types for the security target based on the attack surfaces;
 receive responses for each of the third set of payloads from the security target
 evaluate the responses from the security target; and
 generate a report based on the evaluated responses,
 wherein the automated payload selection system is further operable to:
 select the first set of payloads from the list of stored payloads based on the determined attack types from the scan system.

5. The system of claim 1, wherein the automated payload selection system is further operable to:
 create the test target, wherein the test target is created to have known security issues.

6. A method for automated selection of payloads for a security scan of a web application by a security scanner, the method comprising:
 selecting a first set of payloads from a list of stored payloads;
 attacking a test target with the first set of payloads;
 receiving a test response for each payload in the first set of payloads from the test target;
 determining a second set of payloads that generated a valid test response from the test target;

determining a symmetrical difference for each valid test response for the second set of payloads;
clustering the second set of payloads into groups, the clustering comprising:
comparing each symmetrical difference to a configurable threshold,
classifying payloads of the second set of payloads into one group when the payloads have valid test responses with symmetrical differences that are less than the configurable threshold, and
classifying the payloads of the second set of payloads into different groups when the payloads have valid test responses with symmetrical differences that are more than the configurable threshold,
wherein the payloads within a same group are identified as functionally equivalent;
selecting at least one payload from each group to form a third set of payloads,
wherein selecting at least one payload from each group to form the third set of payloads comprises: selecting oldest payloads, selecting human readable payloads, selecting payloads with fewest characters, or selecting random payloads; and
attacking a security target with the third set of payloads.

7. The method of claim 6, further comprising at least one of reducing processor load, increasing payload selection speed, improving security scans, and reducing network bandwidth when compared to methods that do not utilize the automated selection of the payloads for the security scan.

8. The method of claim 6, wherein the test target is an existing web application with known security issues.

9. The method of claim 6, wherein the test target is created for use as the test target, wherein the test target is created to have known security issues.

10. The method of claim 6, wherein selecting the at least one payload from each group to form the third set of payloads further comprises:
selecting the payloads with the fewest characters.

11. The method of claim 6, wherein selecting the at least one payload from each group to form the third set of payloads further comprises:
selecting the oldest payloads.

12. The method of claim 6, wherein selecting the at least one payload from each group to form the third set of payloads further comprises:
selecting the human readable payloads.

13. The method of claim 6, wherein the determining the symmetrical difference for each valid payload test response for the second set of payloads and the clustering the second set of payloads into groups is performed by a behavior change (volatility) detection system.

14. The method of claim 6, wherein the test target and the security target are both at least one of:
an email application;
a social networking application;
a collaboration application;
an enterprise management application;
a messaging application;
a word processing application;
a spreadsheet application;
a database application;
a presentation application;
a search engine;
a contacts application;
a gaming application;
an e-commerce application;
an e-business application;
a transactional application;
and exchange application; and
a calendaring application.

15. The method of claim 6, further comprising:
receiving the security target;
reading attack surfaces for the security target;
determining attack types for the security target based on the attack surfaces;
wherein the first set of payloads is selected based on the determined attack types;
receiving responses for each of the third set of payloads from the security target;
evaluating the responses from the security target; and
generating a report based on the evaluating of the responses.

16. The method of claim 15, wherein the reading the attack surfaces further comprises:
identifying at least one input;
identifying characters allowed by the at least one input;
determining a maximum and minimum number of the characters that are accepted by the at least one input; and
determining a manner in which the characters are treated by the test target.

17. The method of claim 6, further comprising:
receiving new payloads;
updating a list of payloads based on the new payloads;
storing the list of payloads to form the list of stored payloads.

18. A system for automated selection of payloads for a security scan, the system comprising:
at least one processor; and
one or more computer-readable storage media including computer-executable instructions stored thereon that, responsive to execution by the at least one processor, cause the system to perform operations including:
receiving a security target;
reading attack surfaces for the security target;
determining attack types for the security target based on the attack surfaces;
selecting a first set of payloads from a list of stored payloads based on the attack types;
attacking a test target with the first set of payloads;
receiving a test response for each payload in the first set of payloads from the test target;
determining a second set of payloads that generated a valid test response from the test target, wherein the valid test response is a response that returned results from the test target;
determining a symmetrical difference for each valid test response for the second set of payloads;
clustering the second set of payloads into groups based on the symmetrical difference for the valid test responses for the second set of payloads,
wherein payloads within a same group are identified as functionally equivalent;
selecting at least one payload from each group to form a third set of payloads,
wherein selecting at least one payload from each group to form the third set of payloads comprises:
selecting oldest payload, selecting human readable payloads, selecting payloads with fewest characters, or selecting random payloads;
attacking the security target with the third set of payloads;
evaluating responses for each of the third set of payloads received from the security target; and generating a report based on the evaluating of the responses.

19. The system of claim 18, wherein selecting at least one payload from each group to form the third set of payloads further comprises:

selecting the payloads with the fewest characters.

20. The system of claim 18, wherein selecting at least one payload from each group to form the third set of payloads further comprises:

selecting the oldest payloads.

* * * * *